(No Model.)

E. LIEBERT & S. A. ROSENTHAL.
GALVANIC BATTERY.

No. 400,235. Patented Mar. 26, 1889.

Witnesses:
Vinton Coombs.
Geo. W. Rea.

Inventors:
Edward Liebert & Sally A. Rosenthal
By James L. Norris.
Attorney.

UNITED STATES PATENT OFFICE.

EDUARD LIEBERT AND SALLY ADOLF ROSENTHAL, OF BERLIN, GERMANY.

GALVANIC BATTERY.

SPECIFICATION forming part of Letters Patent No. 400,235, dated March 26, 1889.

Application filed November 30, 1888. Serial No. 292,360. (No model.)

*To all whom it may concern:*

Be it known that we, EDUARD LIEBERT and SALLY ADOLF ROSENTHAL, subjects of the King of Prussia, German Empire, and residents of Berlin, Kingdom of Prussia, German Empire, have invented new and useful Improvements relating to Electric Batteries and to Exciting Liquids or Compounds therefor, of which the following is a specification, reference being had to the accompanying drawings.

The electric battery constructed according to this invention is of extremely small size and considerable efficiency and presents great durability. A peculiar feature of this improved battery is that the tension of the current does not decrease, as in other batteries, after the circuit is closed, but will increase by about one-tenth of the original tension, and thenceforth remain very constant. The battery can, moreover, be used either as a dry or wet battery. Owing to its small size, it can be conveniently carried in the pocket. The electrodes of this battery consist of zinc and silver. The silver electrode is not made of plates or sheets, as in other elements, but of a non-conductor which is coated or covered with foliated or leaf silver. As a rule, hard rubber, glass, impregnated wood, or the like, is employed for this non-conductor; but any other suitable body may be used. Chloride of silver acts as a depolarizing agent, and is applied or fixed in a suitable manner to the surface of the silver.

The exciting-liquid used in the improved battery consists of a mixture of one hundred parts, by weight, of pure water, from twelve to twenty parts of sulphate of zinc, from two to ten parts of sulphuric acid, and from one to six parts of perchloride of mercury. In lieu of the latter substance, protochloride of mercury can be employed, but with less favorable results. The exciting-liquid, if the battery is to be used as a dry battery, can be thickened with tragacanth or similar mucilaginous substance. This liquid has the advantage that it does not attack either the zinc or the chloride of silver when the circuit of the battery is not closed, while when the circuit is closed a comparatively very large quantity of electricity is generated by the liquid. The battery will last for several years.

In the accompanying drawings two forms of the improved electric battery are represented about full size.

Figure 1:
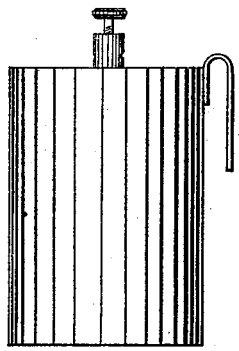
Figure 2:
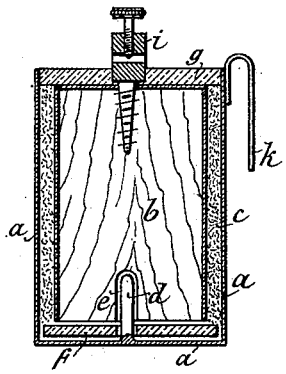
Figure 3:
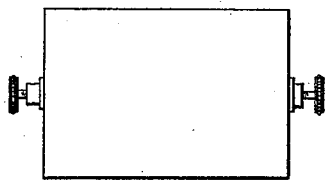

Figure 1 is an elevation, and Fig. 2 a transverse section, of a cylindrical battery. Fig. 3 shows a plan, Fig. 4 a side view, and Fig. 5 a section, of a battery that is rectangular in cross-section.

In Figs. 1 and 2, $a$ designates the zinc electrode, which forms at the same time the casing of the vessel, or the vessel itself. The other electrode is represented as a cylindrical block, $b$, of impregnated wood, upon the outer surface of which the silver is placed, the latter being covered with chloride of silver. The intermediate space between the two electrodes $a$ and $b$ is filled up with the exciting-liquid $c$. In order to keep the wooden block in position, a hole, $e$, is drilled into the same, and a pin, $d$, extends from the bottom of the vessel into this hole. A disk or plate, $f$, of glass or other insulating material, prevents the direct contact of the electrodes $a$ and $b$. The vessel is closed at the top by a cover, $g$, which may consist of pitch or other similar material. The electric current generated leaves the battery through the terminal $i$ and strip $k$.

Figure 4:
Figure 5:
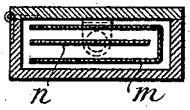

The battery represented in Figs. 3, 4, and 5 does not differ materially from the battery shown in Figs. 1 and 2. In this arrangement the zinc electrode $m$ is U-shaped and embedded in a small box, which is rectangular in cross-section and made of hard rubber, compressed paper, or other suitable insulating material. The silver electrode consists of a strip, $n$, of non-conducting material coated or covered with foliated or leaf silver, and between the two electrodes is introduced the exciting-liquid. The terminals $p$ and $q$, which are connected with the electrodes in any suitable manner, serve to conduct the electric current from the battery.

An electric battery constructed as shown in Figs. 1 and 2, and having a diameter of thirty-six millimeters and a height of fifty millimeters without the binding-screw, can produce a tension at the terminals of about 1.1 volt, and when a resistance of 4.3 ohms is included will generate a constant quantity of current of about 0.2 ampères.

What we claim is—

1. An electrode for an electric battery, consisting of a non-conducting base, a coating or covering of foliated or leaf silver applied thereto, and chloride of silver applied to said coating, substantially as described.

2. An exciting-liquid for silver and zinc batteries, consisting of one hundred parts, by weight, of water, from twelve to twenty parts of sulphate of zinc, from one to four parts of sulphuric acid, and from two to ten parts of perchloride of mercury or protochloride of mercury.

3. A dry exciting agent for electric batteries, consisting of water, sulphate of zinc, sulphuric acid, perchloride or protochloride of mercury, and tragacanth, in or about the proportions specified.

In witness whereof we have signed the foregoing specification this 31st day of October, A. D. 1888.

EDUARD LIEBERT.
SALLY ADOLF ROSENTHAL.

Witnesses:
A. SIEBER,
B. ROI.